Feb. 10, 1970  E. B. WATSON  3,494,288
ROTARY DISTRIBUTOR PUMP
Filed April 22, 1968  4 Sheets-Sheet 1
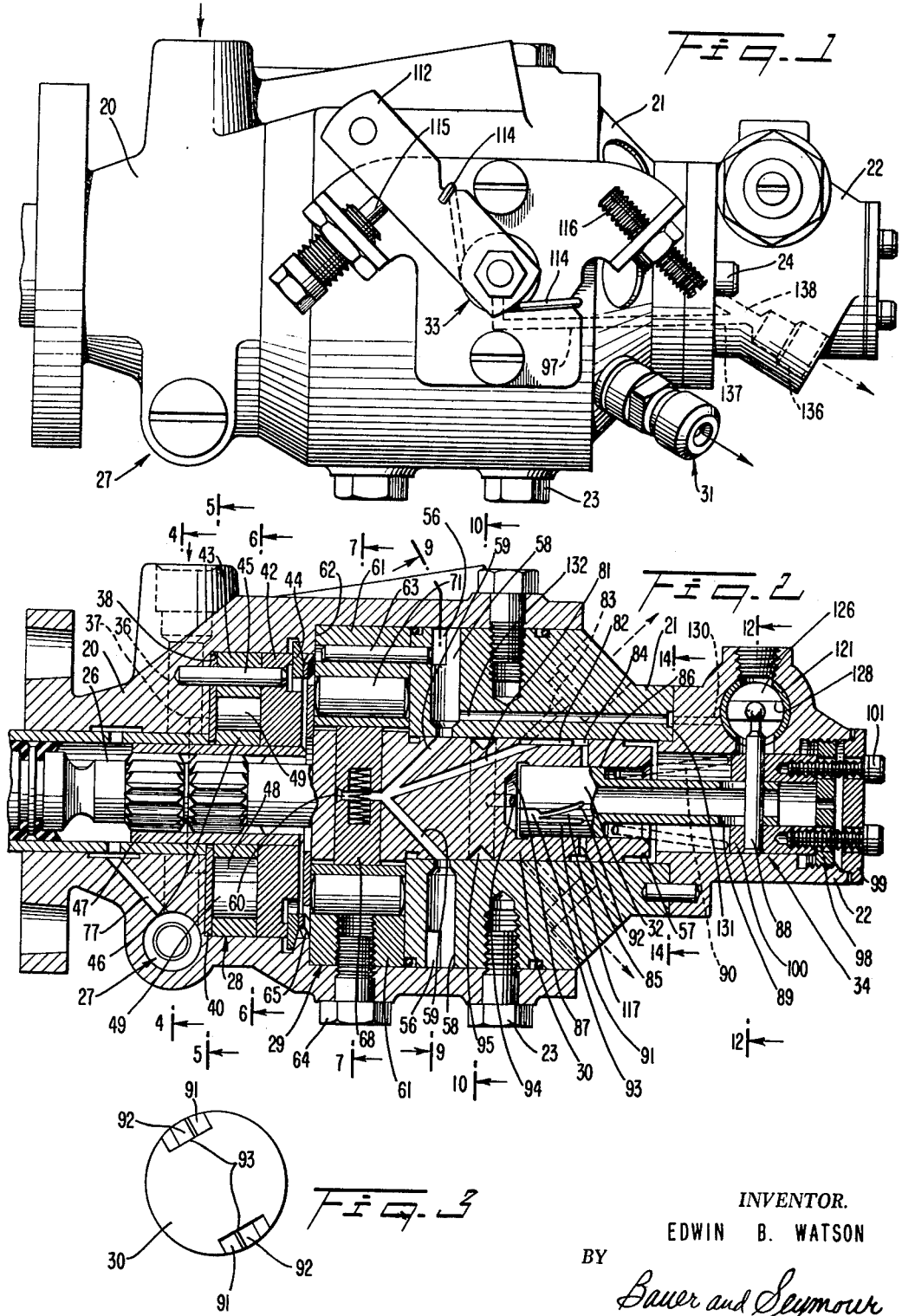
INVENTOR.
EDWIN B. WATSON
BY
Bauer and Seymour
ATTORNEYS

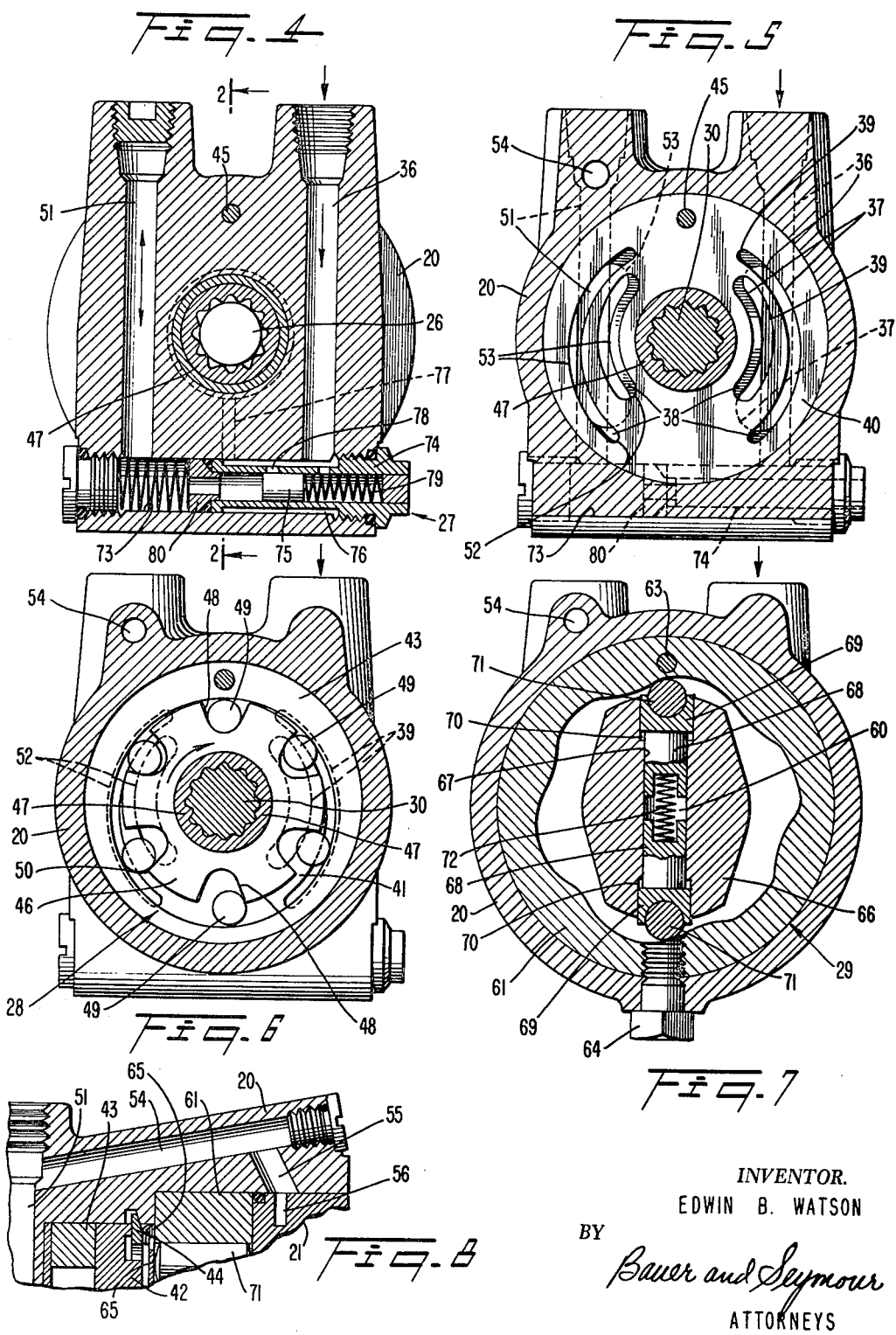

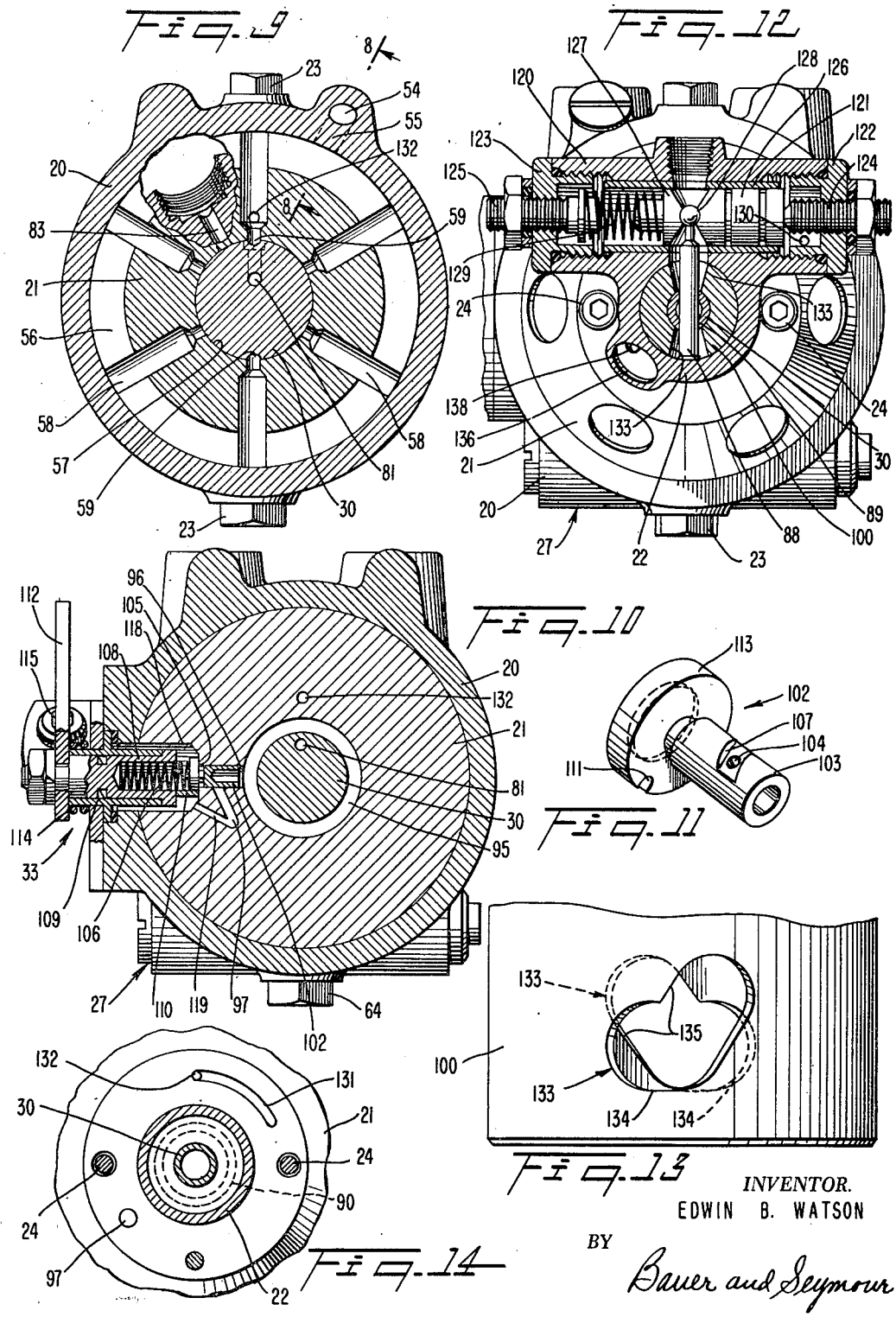

Feb. 10, 1970  E. B. WATSON  3,494,288
ROTARY DISTRIBUTOR PUMP
Filed April 22, 1968  4 Sheets-Sheet 4
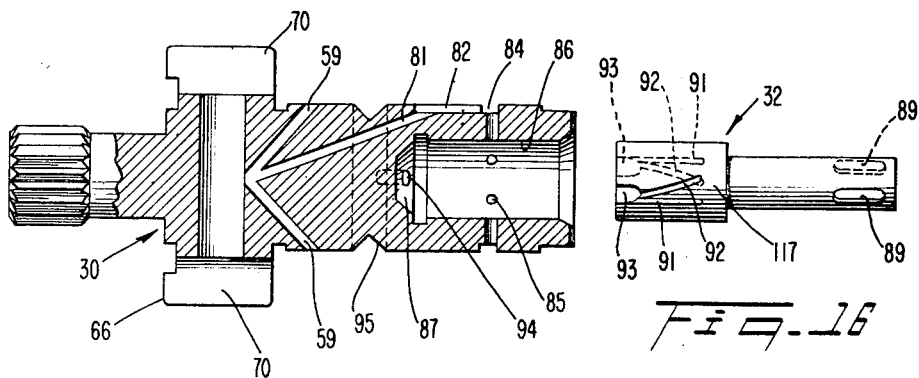
Fig. 15
Fig. 16
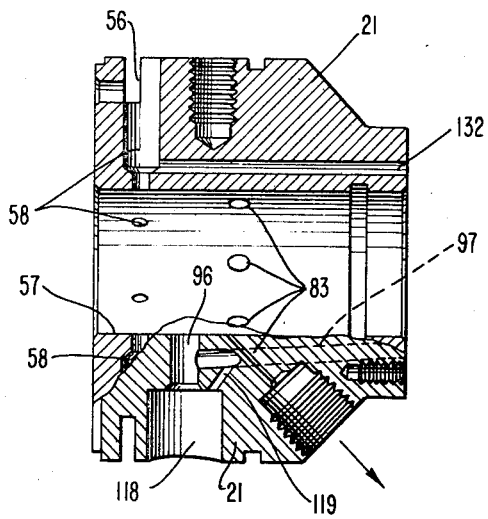
Fig. 17
Fig. 18
INVENTOR.
EDWIN B. WATSON
BY
Bauer and Seymour
ATTORNEYS

# United States Patent Office 3,494,288
Patented Feb. 10, 1970

3,494,288
ROTARY DISTRIBUTOR PUMP
Edwin B. Watson, Sidney, N.Y., assignor to The Bendix Corporation, a corporation of Delaware
Filed Apr. 22, 1968, Ser. No. 723,090
Int. Cl. F04b 13/00, 49/00; F02m 39/00
U.S. Cl. 103—2
25 Claims

ABSTRACT OF THE DISCLOSURE

Rotary distributor type fuel injection pump for multi-cylinder compression ignition engine comprising coaxial rotary transfer pump, opposed radial piston high pressure delivery pump, and distributor rotor, and further comprising valve means to regulate the transfer pump delivery pressure for controlling timing of injection in response to engine speed and hydraulically actuated fuel metering valve means for automatically governing engine speed.

---

This invention relates to fluid pumping and distributing apparatus and more particularly to apparatus for supplying metered quantities of liquid fuel at high pressure to the combustion chambers of multi-cylinder engines.

One of the objects of the present invention is to provide a fuel injection pump with metering means novelly incorporated therein.

Another object of the invention is to provide novel hydraulically actuated means in a fuel pump for automatically controlling the operation thereof and the speed of an engine with which the same is associated.

A further object is to provide a novelly constructed fuel injection pump which is smaller and lighter than prior known pumps capable of performing comparable functions.

Still another object is to provide novel means in conjunction with an engine fuel injection pump for automatically varying the timing of injection in response to pump and engine speed.

A still further object is to provide novel means for automatically controlling, as a function of engine speed, the quantity of fuel per stroke delivered by a fuel injection pump to the combustion chambers of an engine.

Another object is to provide novel means in conjunction with fuel metering apparatus in an injection pump for automatically satisfying the torque backup requirements of an engine supplied by the pump.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side elevation view of one form of six-cylinder engine fuel pump embodying the present invention;

FIG. 2 is a cross sectional view of the pump of FIG. 1, the section being taken substantially in a vertical plane containing the longitudinal axis, as on line 2—2 of FIG. 4;

FIG. 3 is an end view of spill valve 32 as viewed from the left in FIG. 2;

FIG. 4 is a transverse sectional view taken substantially on line 4—4 of FIG. 2;

FIG. 5 is a transverse sectional view taken substantially on line 5—5 of FIG. 2;

FIG. 6 is a transverse sectional view taken substantially on line 6—6 of FIG. 2;

FIG. 7 is a transverse sectional view taken substantially on line 7—7 of FIG. 2;

FIG. 8 is a detail sectional view taken on line 8—8 of FIG. 9;

FIG. 9 is a transverse sectional view taken substantially on line 9—9 of FIG. 2, with a portion broken away to shown an outlet or delivery passage;

FIG. 10 is a transverse sectional view taken substantially on line 10—10 of FIG. 2;

FIG. 11 is an isometric view on an enlarged scale of the throttle valve;

FIG. 12 is a transverse sectional view taken substantially on line 12—12 of FIG. 2;

FIG. 13 is an enlarged scale top plan view of the left-hand portion of control sleeve 100 as viewed in FIG. 2;

FIG. 14 is a partial sectional view taken on line 14—14 of FIG. 2;

FIG. 15 is a detail sectional view of the pump-distributor rotor;

FIG. 16 is a detail side elevation view of the metering or spill valve;

FIG. 17 is a detail sectional view of the distributor head; and

FIG. 18 is a detail sectional view of the casing part for housing the control mechanism for injection timing.

A single embodiment of the invention is illustrated in the drawings, by way of example, in the form of a combined fuel pumping, distributing and control apparatus for a six-cylinder solid fuel injection engine. The apparatus comprises a hollow casing having three main parts 20, 21 and 22 (FIG. 2) secured together by bolts 23 and 24. The basic working components of said apparatus comprise, from left to right in FIG. 2, a drive shaft 26, an intake pressure regulating valve 27, a roller type transfer pump 28, a radial-piston, high-pressure delivery or injection pump 29, a combination pump and distributor rotor 30, a plurality of delivery valves 31, a combined fuel metering and hydraulic governor valve 32, a throttle valve 33 (FIG. 10) and a hydraulic timing and torque backup control mechanism 34. Casing member 21 functions as a distributor head, and rotor 30 functions additionally as a casing for metering valve 32.

Fuel enters the apparatus from a suitable supply source under low pressure through a passage 36 which intersects an arcuate groove 37 (FIG. 5) in the annular shoulder 38 of casing member 20. Groove 37 and hence, passage 36, communicate through arcuate openings 39 in a bi-metal disc or plate 40 with the intake chamber 41 of transfer pump 28. The latter may be of any suitable known construction and as shown, comprises an end plate 42 and a cam ring 43, the inner cylindrical surface of which is eccentric to the longitudinal axis of the apparatus. Plate 42 is held in place by split ring 44 anchored in an annular groove in casing 20. Retaining ring 44 may be tapered at the periphery thereof to resiliently wedge plate 42 into firm engagement with cam ring 43. Any suitable known means, such as a dowel pin 45, may be used to angularly orient cam ring 43 and plates 40 and 42 in housing 20.

A rotor 46 is mounted between plates 40 and 42 on a sleeve 47 for rotation therewith. Said sleeve is in turn drivably connected, such as by splines, to drive shaft 26. The periphery of rotor 46 has axially extending grooves 48 for seating cylindrical rollers 49. The rotor is concentrically mounted and hence, together with rollers 49, in a manner well understood in the art, forms the low pressure intake chamber 41 and a higher pressure discharge chamber 50 with the rotor turning clockwise, as viewed in FIG. 6. The discharge side 50 of transfer pump 28 is in constant communication with a drilled passage 51 through arcuate openings 52 in end plate 40 and an arcuate groove 53 in shoulder 38, which groove is intersected by said passage 51.

At its upper end fuel passage 51 is connected by drilled passages 54 and 55 (FIGS. 2 and 8) to an annular groove 56 in casing member 21 within casing member 20, and said groove is connected to the bore 57 through member 21 by six equally angularly-spaced, radial passages 58. The latter are adapted to be periodically connected through one or more angular passages 59 (two as shown) in rotor 30 to the pressure chamber 60 of the high pressure injection pump 29 to be next described.

Although pump 29 may be of any suitable known construction, the same as illustrated comprises a cam ring 61 seated in casing 20 between shoulder 62 and the inner end face of casing member 21, which is angularly oriented therewith by a dowel 63. Cam ring 61 may be secured in place by a screw 64. Rotor 30, which has a close running fit in the bore of casing 21, extends through cam ring 61 and a reduced end portion thereof is provided with splines for driving engagement with sleeve 47 and hence, with drive shaft 26. A disc 65 having spring fingers at the periphery thereof may be interposed between split ring 44 and rotor 30 to hold the latter against the end of distributor head 21. Within cam ring 61 the rotor 30 has diametrically disposed enlargements 66 (FIG. 7) in which is provided a transverse cylindrical passage 67 for slidably receiving a pair of reciprocable pistons 68. The outer ends of the pistons engage blocks 69 which slide radially in axially extending slots 70 and are grooved to carry rollers 71 that engage and follow the inner way surface of cam ring 61. This surface provides three pairs of diametrically disposed cam lobes whereby the oppositely disposed piston-block-roller assemblies 68–71 are simultaneously moved inwardly six times during each revolution of the rotor 30 against centrifugal force and if desired, against the pressure of a spring 72. During the portions of each rotor revolution when pistons 68 are moved radially outwardly by centrifugal force and spring 72, as permitted by annular cam surface 61, the rotor passages 59 register with radial passages 58 in distributor head 21, and fuel is pumped by transfer pump 28 into the expanded pressure chamber 60 between the pistons. Thus, during each radial reciprocation of pistons 68, said pressure chamber is completely refilled with a fixed quantity of fuel from the transfer pump through passages 59.

When pump pressure chamber 60 is full, and whenever inlet passages 58 and 59 are out of register, the fuel delivered by the transfer pump 28 is returned to the supply line, and hence, to the intake side of pump 28 through pressure regulating valve 27. The latter in the form shown comprises a transverse valve chamber 73 (FIG. 4) which connects at its opposite closed ends with the lower ends of fuel passages 36 and 51. A hollow valve body 74 houses a piston valve 75 and has an external groove forming an annular chamber 76 in communication with fuel supply passage 36 and with a leakage fuel bleedback passage 77 connected to the space around shaft 26. Piston valve 75 is urged toward the left (FIG. 4) across a radial port 78 by a spring 79, and said port is normally covered by the valve when the transfer pump is refilling the pressure chamber 60 of pump 29 as explained above. A peripheral seal may be provided at the inner end of body 74 by an O-ring gasket and a spring pressed conical washer 80.

When the flow of fuel from pump 28 to pump 29 is interrupted for any reason, the full pressure of the fuel discharged from pump 28 is applied to valve 75 causing it to compress spring 79 and to at least partially uncover relief port 78. Under these conditions the pressure of the fuel delivered by pump 28 will vary with the speed of the pump and hence, with the speed of the engine driving shaft 26. By properly selecting the component parameters, such as the rate of spring 79, the contour or shape of variable orifice 78, and the transverse area of valve 75, the pressure of the confined fuel may be regulated by valve 27 to vary as a straight line function of the speed (r.p.m.) of the pump and the engine. The fuel pressure thus regulated may be used to automatically regulate the timing of fuel injection into the engine cylinders and also to satisfy the torque backup requirements of the engine with changes in speed.

A diagonal high pressure fuel passage 81 in rotor 30 connects pump pressure chamber 60 to an axially extending groove 82 in the surface of the rotor. During each revolution of the rotor, groove 82 registers sequentially with six equally spaced outlet or delivery passages 83 in distributor head 21 which alternate circumferentially with fuel inlet passages 58. Each of the passages 83 is connected to a different cylinder of the engine, preferably through a delivery valve 31, only one of which is shown, mounted in a recess in the distributor head 21 and the usual injection nozzle at the engine cylinder. The valves 31 may be of any of many well known suitable constructions.

Groove 82 also connects with an annular groove 84 in the surface of distributor rotor 30 from which six equally angularly-spaced, radial passages 85 lead to a central bore 86 in the rotor forming a valve chamber 87. The cylindrical metering or spill valve 32 has a sliding fit in bore 86, but the same is held against rotation with rotor 30 by a cross pin 88 which extends diametrically through an elongated axially extending slot 89 in the reduced hollow stem of the valve that extends rearwardly from the end of rotor 30 through casing member 22 and into the bore of a control sleeve 100. Slot 89 permits but limits axial movement of valve 32 relative to rotor 30 and hence, relative to passages 85. The valve is normally yieldably urged axially toward the left (FIG. 2) by a preloaded spring 90 to the limit position illustrated in the drawing, with the end of slot 89 engaging pin 88. The latter is positioned, in a manner to be hereinafter more specifically described, by the sleeve 100 which is in turn positioned axially and angularly by a ring nut 98 threaded into casing 22, an end plate 99 and threaded bolts 101.

Valve 32 is provided with one or more sets of diverging grooves 91 and 92 in the surface thereof arranged for sequential registry with radial passages 85. Said grooves merge into a single groove 93 near the forward or left end of the valve and thus communicate with chamber 87. The latter is connected by one or more passages 94 with an annular groove 95 in the surface of rotor 30 (FIG. 2) which opens into a radial throttle valve chamber 96 (FIG. 10) in distributor head 21. Said chamber is suitably connected, such as by a passage 97, to a low pressure sump or return line to the fuel tank.

In the form illustrated, the throttle valve for varying the speed of the engine comprises a valve member 102 (FIG. 11) having a cylindrical portion 103 and a head portion 113 that is normally seated against an internal shoulder 105 by a preloaded spring 106. Portion 103 of the valve is centrally recessed and has a radial port 104 which may, by rotation of the valve member 102, be caused to communicate with fuel return passage 97 through a suitably shaped groove 107 in the outer surface thereof. The groove 107 may, for example, be an eccentric groove. It will be seen that port 104 and groove 107 may be variously shaped to form, in cooperation with the end of passage 97, an orifice for the spilling or escape of fuel from chamber 96 to the return line 97, the size of which orifice will vary with the angular position of valve 102.

Angular adjustment of valve 102 may be effected by means of a shaft 108 journalled in a sleeve 109 and having an eccentric extension 110 that engages a radial slot 111 in valve head 113. Shaft 108 and hence, valve 102 may be manually rotated by an actuating lever 112 to vary the setting of escape orifice 104, 107. Lever 112 is urged by a spring 114 to engine idle position (FIG. 1) against an adjustable stop 115. Another adjustable stop 116 is provided to limit movement of the throttle lever in the other direction, i.e., clockwise in FIG. 1, to determine the run-out speed at which fuel supplied to the engine is automatically cut off in a manner to be hereinafter described.

The relative angular positions of the pump cam 61, distributor head 21 and valve 32 are such that when pump plungers 68 begin to move inwardly on their pumping stroke, rotor passages 59 will be out of register with inlet passage 58, but groove 82 and hence, passage 81 will be in register with one of the outlet passages 83. At the beginning of each pumping stroke, the groove 91 on valve 32 will also be in register with a radial passage 85 and hence, connected to rotor groove 82, 84. Because of the high pressure required to open the delivery valve and the injection nozzle interposed between outlet passage 83 and the engine cylinder, the initial flow of fuel from pump 29 during each pumping stroke thereof will take place through passage 81, slot 82, annulus 84, a passage 85 and valve groove 91 into chamber 87 and thence through passages 94, anulus 95, and throttle valve orifice 104, as described above, to the low pressure fuel return line 97. Upon further counterclockwise rotation of the distributor rotor, as viewed from the left in FIG. 2, the land 117 between grooves 91 and 92 on valve 32 will cover radial passage 85 and cut off flow into chamber 87. The pressure of the fuel being delivered by the pump 29 will now rise sufficiently to open the delivery valve 31 and the injection nozzle at the engine to permit fuel flow to the engine combustion chamber until a passage 85 of the rotor 30 moves into registry with groove 92 to again permit fuel flow to the throttle valve orifice 104 in the manner above described. It will thus be seen that the beginning of injection to an engine cylinder is determined by the angular position of valve groove 91 relative to rotor 30 and the passages 85 therein. The duration of each injection at any given engine or pump speed is determined by the circumferential width of land 117 in the plane of passages 85 and hence, upon the axial position of valve 32 relative to rotor 30. The end of injection is determined by registry of groove 92 with a rotor passage 85.

The metering valve 32 and variable orifice throttle valve 102 function in a novel manner to automatically govern the speed of an engine supplied by the pump. It will be evident that for any given setting of variable throttle orifice 104, 107, the average pressure of the fuel by-passed across valve 32 into chamber 87 will increase as the pump speed increases. This results from the fact that for any given position of valve 32, the quantity of fuel by-passed per unit of time increases with rotor speed. Thus, when the rate at which fuel is pumped past valve 32 exceeds the rate at which the fuel can escape through throttle orifice 104, the pressure in chamber 87 builds up and causes valve 32 to move to the right (FIG. 2) against the pressure of spring 90 to establish equilibrium between the fuel pressure in chamber 87 acting on the face of valve 32 and the opposing force of the spring. The effective portion of land 117 is decreased as valve 32 moves to the right so that less fuel is injected into the engine cylinder and engine speed is accordingly reduced. By properly selecting the pre-load and rate of valve spring 90 for any given pump and engine, valve 32 will be hydraulically actuated by the fuel pressure in chamber 87 to an equilibrium position at which the spill valve land 117 and other surfaces of the valve between the grooves will cover the spill holes 85 long enough for the pump to inject sufficient fuel into the engine cylinder to sustain a predetermined engine and pump speed (r.p.m.) under a given load at a given throttle orifice setting. If the engine speed increases for any reason, the fuel pressure in chamber 87 will increase and cause movement of valve 32 to the right to effect a reduction of fuel delivery to the engine and a consequent reduction in speed. The reverse operation of valve 32 will occur on a reduction in engine speed below that predetermined by the throttle orifice setting.

As mentioned above, the throttle valve control lever 112 is held in engine idle position against stop assembly 115 by a spring 114. The stop button of said assembly is a spring loaded plunger which may be overcome by applying force in addition to that of spring 114 to move the lever further counterclockwise (FIG. 1) to its shutdown position. In this position, the connection between throttle orifice 104 and passage 97 is completely closed, thereby preventing the escape of fuel from valve chamber 87. Accordingly, the pressure builds up and moves valve 32 to the right to a position such that groove 93 is in the plane of spill holes 85 and in register therewith during the entirety of each pumping stroke of pump 29. Accordingly, no fuel will then be pumped to the engine cylinders, and operation of the engine will cease.

To avoid a rise in fuel pressure in spill valve chamber 87 in excess of the magnitude required to move valve 32 to shutdown position, the throttle valve 102 functions also as a relief valve. When said pressure exceeds the predetermined maximum, valve 102 is moved thereby to the left (FIG. 10) against preloaded spring 106 until fuel can escape freely through port 104 into the enlarged bore 118 of the valve chamber and thence through a passage 119 to the fuel return passage 97.

Novel means are provided in combination with the pumping and metering apparatus heretofore described for automatically controlling the timing of the injections into the engine cylinders in response to engine speed. In the specific form shown, by way of example, said means comprises a transverse cylinder 120 formed as a part of casing member 22. Said cylinder has a liner 121 and is closed at its ends by nuts 122 and 123 which carry axially adjustable stop bolts 124 and 125, respectively. A two-part plunger 126, 127 is slidable in liner 121, and adjacent ends of the two parts are wedge-shaped with transverse semi-circular grooves 128 which engage opposite sides of the ball-shaped upper end of pin 88. Liner 121 and casing 22 are provided with registering radial openings through which pin 88 extends from the casing into the cylinder 120.

Movement of plunger 126 toward the right (FIG. 12) is limited by adjustable stop 124 against which it is normally held by a spring 129 interposed between plunger member 127 and adjustable stop 125. Cylinder 120 to the right of plunger 126 is continuously connected to the delivery side of transfer pump 28 through passage 130, arcuate groove 131, passage 132 (FIGS. 2 and 14), one of passages 58, annulus 56 and passages 55, 54 and 51 (FIGS. 8 and 9). Thus, fuel under pressure as regulated by valve assembly 27 acts continuously upon plunger 126 and hence, upon the upper end of pin 88 in opposition to spring 129. The lower end of pin 88 during movement thereof by plunger 126, 127 is guided and maintained perpendicular to the axis of valve 32 by identical diametrically disopsed slots 133 in the walls of sleeve 100. As shown, each said slot comprises a straight transverse portion 134 and a helical extension 135, the width of the slot being such as to slidably receive pin 88.

As explained above, the transfer pump delivery pressure acting on plunger 126 is regulated to vary as a straight line function of engine speed. Accordingly, at a predetermined engine speed the fuel pressure acting on plunger 126 overcomes the preload of spring 129 and causes counterclockwise rotation of pin 88, as viewed in FIG. 12, in a transverse plane and a corresponding rotation of valve 32. This angular movement or adjustment of said valve relative to distributor rotor 30 changes the position of metering groove 91 relative to spill passages 85 so as to advance the closing of said passages by land 117 and hence, to advance the beginning of injections in relation to the cycle of engine operation. Thus, by proper selection of the pre-load and rate of spring 129, automatic variation of injection timing in response to engine speed may be attained.

The helical portions 135 of slots 133 in sleeve 100 are provided for novelly controlling operation of the pump to satisfy the torque backup requirement of the engine. For most engines this requirement consists in a reduction, as some function of speed, in the maximum amount of fuel per injection which the pump is capable of delivering to the engine, usually a cut-back in fuel quantity with increased engine speed. Thus, the specific design of slots 133 will vary for different engines. As here shown, the helical portions 135 of slots 133 are engaged by pin 88 only after some timing advance has been effected in the manner described above without variation of the quantity of fuel delivered per pumping stroke to the engine. Upon further rotation of pin 88 by plunger 126 in response to greater engine speed, said pin traverses helical portions 135 and hence, has imparted thereto a linear component of motion toward the right (FIG. 2) along the axis of valve 32. The valve is thus rotated to further advance the beginning of injection and the pin 88 is moved axially of sleeve 100 to a position which results in limiting the movement of valve 32 toward the left (FIG. 2) as determined by engagement of the end of slot 89 with pin 88 and hence, results in reducing the maximum quantity of fuel per injection that the pump can deliver to the engine.

A socket 136 is provided in casing member 22 (FIG. 1) for a suitable fitting and fuel return line. The socket communicates through passages 137 and 138 with low pressure fuel passage 97 and the bore of casing 22, respectively, to carry away leakage fuel.

The novel construction and operation of the pump heretofore described permit the making of adjustments at the time of assembly or in the field to satisfy the performance parameters of different engines without changes in the basic structure of parts. For example, maximum fuel delivery setting may be varied by varying the position of spanner nut 98 in casing 22 to thereby vary the axial position of sleeve 100 and hence, pin 88 to limit the movement of valve 32 toward the left (FIG. 2). The beginning of injection as related to the profile of delivery pump cam 61 may be timed to start at any given cam degree by adjusting plunger stop screw 124 with the parts in full retard position. The engine speed at which a timing advance is to begin may also be varied by adjustment of stop screw 125 to vary the pre-load on spring 129. The beginning of torque cutback in relation to engine speed may be varied by angular adjustment of cover plate 99 and hence, slotted guide sleeve 100, before tightening the screws 101.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:
1. In a fuel pump adapted to be used as an injection pump for internal combustion engines and the like, said pump having a pump body, a rotor mounted within the body, fuel injecting means including pumping means disposed within the body and actuated by rotation of the rotor relative to the body for delivering charges of fuel under high pressure at spaced intervals, first conduit means receiving the output of the fuel injecting means and being adapted to be connected to an engine cylinder through a pressure actuated delivery valve interposed in the first conduit means in advance of the cylinder, and a spill valve which is adjustable between first and second terminal positions and which spills fuel from the first conduit means interposed in the first conduit means in advance of the delivery valve to control the injection of fuel into the engine at each fuel injecting operation of the pumping means, the improvement which comprises second conduit means receiving fuel spilled by the spill valve, means having a restricted orifice interposed in the second conduit means, means responsive to the pressure of the thus spilled fuel in advance of said orifice for urging the spill valve toward its first terminal position, and yieldable means for constantly urging the spill valve toward its second terminal position.

2. A fuel pump according to claim 1, wherein the spill valve is a metering valve, and said first terminal position of the spill valve is that of minimum fuel flow therethrough, and the second terminal position thereof is that of maximum fuel flow therethrough, whereby the speed of the engine under variable load is held at a substantially constant speed which is determined by the effective area of the orifice.

3. A fuel pump according to claim 2, wherein the means having a restricted orifice comprises an adjustable throttle valve, whereby the engine speed may be varied by adjustment of the orifice through said throttle valve.

4. A fuel pump according to claim 3, wherein the metering valve has a part adjustable along a path and a part which is fixed with respect to said path, and the rate of flow of fuel at a given pressure through the metering valve varies substantially in a straight line relationship upon adjustment of said adjustable part of the metering valve with respect to the fixed part thereof.

5. A fuel pump according to claim 4, wherein the means responsive to the pressure of fuel spilled through the metering valve comprises an expansible chamber connected to the second conduit means in advance of the orifice, said expansible chamber having a wall composed in part of a movable member, and means connecting the movable member to the adjustable part of the metering valve.

6. A fuel pump according to claim 5, wherein the adjustable part of the metering valve reciprocates, the movable member of the expansible chamber reciprocates, and the means connecting the movable member and the adjustable part of the metering valve rigidly secures them together for movement in the same direction and amount.

7. A fuel pump according to claim 6, wherein the yieldable means is a spring, the deflection of which, in the range of adjustment of the metering valve, varies substantially in accordance with the magnitude of the spring deforming force applied thereto.

8. A fuel pump according to claim 4, wherein the fixed part of the metering valve comprises a surface of the rotor which is a surface of revolution lying coaxial of the rotor, and the adjustable part of the metering valve comprises a member which is mounted coaxial of the rotor, which has a surface which sealingly engages said surface of the rotor, and which is adjustable axially of the rotor to adjust said metering valve.

9. A fuel pump according to claim 1, wherein the pumping means comprises at least one cylinder, a plunger mounted in the cylinder, and means driven by the rotor for reciprocating the plunger in timed relationship therewith, whereby the pumping means delivers fuel charges at timed intervals in synchronism with the rotation of the rotor.

10. A fuel pump according to claim 9, comprising a rotary distributor within the pump body formed by cooperating parts of the body and rotor, said distributor being interposed in the first conduit means between the pumping means and the delivery valve.

11. Fuel pumping apparatus comprising a plurality of delivery conduits, a spill conduit, cyclically operable pump means for intermittently pumping predetermined quantities of fuel under pressure to said conduits, spill valve means for controlling flow of said fuel into the spill conduit, means for limiting the maximum rate at which the fuel flows from said spill conduit, means for cyclically opening and closing said spill valve means in timed relation with said pump means, and delivery valve means responsive to fuel pressure generated by the pump means for permitting fuel flow under pressure from a said delivery conduit only when said spill valve means is closed, said spill valve means being responsive to fuel pressure in said spill conduit to vary the ratio of spill valve means open-time to spill valve means closed-time during each pumping cycle of the pump means.

12. Apparatus as defined in claim 11 wherein said means for limiting the maximum flow rate from the spill conduit comprises a variable flow restricting orifice.

13. Apparatus as defined in claim 12 wherein the spill valve means is operable to increase the open-time thereof during each pumping cycle of the pump means in response to fuel pressure in the spill conduit in excess of a predetermined value.

14. Apparatus as defined in claim 12 wherein for a given size of flow restricting orifice the fuel pressure in the spill conduit increases with an increase in the cyclical frequency of the pump means.

15. Apparatus as defined in claim 11 wherein said spill valve means comprises a rotatable part connected to be driven in timed relation with said pump means.

16. Apparatus as defined in claim 15 wherein said rotatable part connects the pump means successively to delivery conduits during each revolution thereof.

17. Apparatus as defined in claim 15 wherein said spill valve means comprises a part movable axially of said rotatable part to vary the open-time of said spill valve means during each pumping cycle of the pump means.

18. Apparatus as defined in claim 17 comprising resilient means for urging said axially movable part to its minimum cyclical open-time position.

19. Fuel injection apparatus for a combustion engine comprising cyclically operable pump means adapted to be driven by the engine for pumping a predetermined quantity of fuel under pressure during each pumping cycle, a delivery line connecting the pressure chamber of the pump means to a combustion chamber of the engine, adjustable spill valve means for spilling variable portions of said predetermined quantities of fuel from said delivery line to a spill chamber to thereby vary the speed of the engine and the cyclical speed of the pump means, and means including a restricted outlet from said spill chamber for automatically adjusting said spill valve means in response to variations of fuel pressure in said spill chamber to vary the magnitude of said spilled portions.

20. Apparatus as defined in claim 19 wherein said spill valve means comprises two relatively rotatable parts, one said part being rotated in timed relation with said pump means to effect cyclical opening and closing of the spill valve means.

21. Apparatus as defined in claim 20 wherein the other of said parts is movable in one direction axially of the axis of rotation by fuel under pressure in said spill chamber, and comprising resilient means under compression for moving said other part axially in opposition to the fuel pressure in the spill chamber.

22. Apparatus as defined in claim 21 wherein axial movement of said other part effects variations in the cyclical open and closed times of the spill valve means.

23. Apparatus as defined in claim 19 wherein said automatic adjustment of the spill valve means effects an increase in the magnitude of said spilled portions in response to an increase of fuel pressure in said spill chamber.

24. Apparatus as defined in claim 19 wherein the fuel pressure in the spill chamber is dependent upon the cyclical speed of the pump means, the open-time of the spill valve means during each pumping cycle of the pump means and the size of said restricted outlet.

25. Fuel injection apparatus for a combustion engine comprising means for cyclically pumping a predetermined fixed quantity of fuel during each pumping cycle, means including normally closed pressure responsive valve means for connecting the pressure chamber of the pumping means to a combustion chamber of the engine, a spill cavity, means including spill valve means for diverting a portion of said fixed quantity to said spill cavity, and means for controlling the escape of fuel from said cavity, said spill valve means being operable in response to variations of average fuel pressure in said spill cavity for varying the magnitude of said diverted portion.

References Cited

UNITED STATES PATENTS

| | | | |
|---|---|---|---|
| 2,465,138 | 3/1949 | Van-Tuyl | 103—37 |
| 2,831,473 | 4/1958 | Liadet | 123—140.1 |
| 2,839,999 | 6/1958 | Shallenberg | 103—37 |
| 3,025,797 | 3/1962 | Hutcheon | 103—2 |
| 3,035,523 | 5/1962 | Kemp et al. | 103—2 |
| 3,228,339 | 1/1966 | Evans et al. | 103—2 |
| 3,314,406 | 4/1967 | Kemp et al. | 103—2 |
| 3,368,490 | 2/1968 | Virello | 123—139 |
| 3,381,615 | 5/1967 | Bailey | 103—2 |
| 3,427,979 | 2/1969 | Kemp | 103—2 |
| 3,437,042 | 4/1969 | Kemp | 103—41 |
| 2,922,371 | 1/1960 | Bischoff | 103—5 |

HENRY F. RADUAZO, Primary Examiner

U.S. Cl. X.R.

103—5, 37; 123—139